United States Patent
Reed

[15] 3,648,525
[45] Mar. 14, 1972

[54] GYROSCOPIC STABLE REFERENCE APPARATUS

[72] Inventor: Charles B. Reed, 1290 Avenue of the Americas, Scottsdale, Ariz. 10019

[22] Filed: Feb. 11, 1970

[21] Appl. No.: 10,537

[52] U.S. Cl..............................................74/5.34, 74/5.8
[51] Int. Cl.....................................................G01c 19/54
[58] Field of Search..................74/5.34, 5.8, 5.4; 33/204 C; 73/504

[56] References Cited

UNITED STATES PATENTS

| | | | |
|---|---|---|---|
| 3,214,983 | 11/1965 | Dozier | 74/5.34 |
| 3,238,795 | 3/1966 | Greenberg et al. | 74/5.4 X |
| 3,267,745 | 8/1966 | Smead et al. | 74/5.4 |
| 3,323,380 | 6/1967 | Bosch et al. | 74/5.34 |
| 3,355,954 | 12/1967 | Levine et al. | 74/5.34 |
| 3,455,172 | 7/1969 | Burns et al. | 74/5.8 X |
| 3,509,765 | 5/1970 | Stevenson et al. | 74/5.34 X |

FOREIGN PATENTS OR APPLICATIONS 649,268   9/1962   Canada..................................74/5.34

*Primary Examiner*—Manuel A. Antonakas
*Attorney*—Samuel C. Yeaton

[57] ABSTRACT

A gyroscopic stable reference apparatus for navigable craft which provides heading, pitch and roll outputs that are free of gyroscopic gimbal errors for all aircraft attitudes with a minimum of undesirable interaction between the directional and vertical gyroscopes.

5 Claims, 1 Drawing Figure

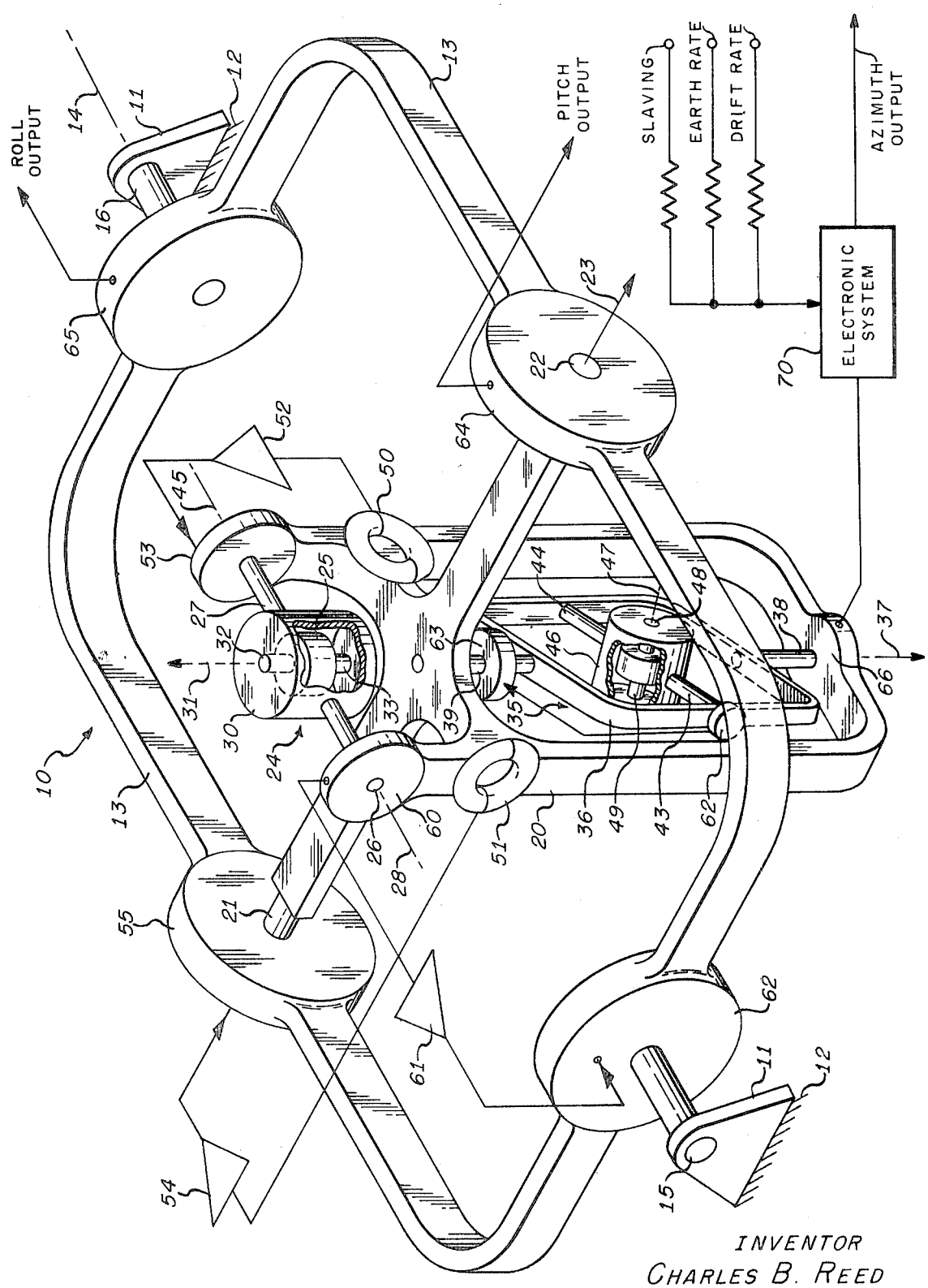

GYROSCOPIC STABLE REFERENCE APPARATUS

The invention herein described was made in the course of or under a contract or subcontract thereunder with the Department of the Air Force.

BACKGROUND OF THE INVENTION

1. Field of the Invention

This invention pertains to gyroscopic stable platforms for providing attitude information about three mutually perpendicular reference axes with respect to the craft on which it is mounted.

2. Description of the Prior Art

Prior art gyroscopic stable platforms generally utilize either floated inertial elements to obtain high accuracy or in an electromechanical sense they are exceedingly complex. The stable platforms utilizing floated inertial elements are relatively expensive, difficult to manufacture and must be maintained within a proper temperature range to maintain accuracy requirements. Stable platforms utilizing non-floated inertial elements normally do not have an all-attitude capability, i.e., the reference information provided by the stable platform is not accurate throughout all maneuvers capable of being performed by the aircraft on which it is mounted. Further, the complexity of prior art stable platforms renders them extremely expensive and subject to reliability problems because of their complexity. Usually they also suffer from undesirable interaction between the directional and vertical gyroscopes which comprise the platform. Since the directional gyroscope is usually not stabilized in pitch and roll in prior art devices, the heading information from the directional gyroscope includes intercardinal gimbal errors.

SUMMARY OF THE INVENTION

The present invention utilizes a relatively simple construction having five gyroscopic gimbals and only one servo system thereby rendering the stable platform relatively inexpensive, simple to manufacture and reliable in operation. The gimballing arrangement of the present invention provides an all-attitude capability while also providing extremely accurate attitude information with respect to three orthogonal axes of the craft on which it is mounted. By stabilizing the directional gyroscope in both pitch and roll, heading information is provided which is free from the intercardinal gimbal errors of a conventionally mounted directional gyroscope.

BRIEF DESCRIPTION OF THE DRAWING

The single FIGURE of the drawing discloses a schematic perspective of a gyroscopic stable reference apparatus constructed in accordance with the present invention.

DESCRIPTION OF THE PREFERRED EMBODIMENT

Referring to the drawing, a three axis gyroscopic stable platform 10 is disclosed mounted for rotation within a housing 11 that is fixed with respect to the aircraft 12, for example, the outer roll gimbal 13 of the stable platform 10 is mounted for rotation about an axis 14 that is preferably coincident with the fore and aft or roll axis of the aircraft 12 about which the aircraft rolls. The outer roll gimbal 13 is pivotally mounted to rotate about the axis 14 by means of spaced bearings 15 and 16. The pitch gimbal 20 of the stable platform 10 is rotatably mounted on the outer roll gimbal 13 by means of spaced bearings 21 and 22 for rotation about an axis 23 that is perpendicular to the roll axis 14. The axis 23 is normally parallel with the athwartship axis of the aircraft 12 about which the craft pitches.

The pitch gimbal 20 forms a portion of a vertical gyroscope 24 which has its inner gimbal 25 pivotally mounted to rotate with respect to the pitch gimbal 20 by means of spaced bearings 26 and 27 around an inner roll axis 28 that is normally parallel to the axis 14. The rotor assembly 30 of the vertical gyroscope 24 is in turn rotatably mounted to spin about a normally vertical spin axis 31 within the inner gimbal 25 by means of spaced bearings 32 and 33.

A directional gyroscope 35 is also mounted within the pitch gimbal 20 to provide azimuthal reference information. The directional gyroscope 35 is mounted on the portion of the pitch gimbal 20 which extends beyond the axis 23 and preferably below the vertical gyroscope 24 in order that the directional gyroscope 35 is not subject to temperature variations which would otherwise be caused by the vertical gyroscope. The outer or azimuth gimbal 36 of the directional gyroscope 35 is pivotally mounted for rotation about an azimuth axis 37 by means of spaced bearings 38 and 39. The azimuth axis 37 is normally maintained coincident with the vertical spin axis 31 of the vertical gyroscope 24 in a manner to be explained. The inner gimbal 42 is pivotally mounted within the outer gimbal 36 by means of spaced bearings 43 and 44 for rotation about an axis 45. The rotor assembly 46 of the directional gyroscope 35 is in turn mounted to spin about a normally horizontal axis 47 within the inner gimbal 42 by means of spaced bearings 48 and 49.

Preferably, pitch and roll accelerometers 50 and 51, respectively, are mounted on the pitch gimbal 20 to sense tilt of the pitch gimbal 20 from the gravity vertical position. The pitch and roll accelerometers 50 and 51 may be of the annular type as disclosed in U.S. Pat. application Ser. No. 769,951 entitled "Toroidal Electrolytic Sensor and Method Of Manufacturing Same" invented by T. S. Fox et al., and filed Oct. 23, 1968. The pitch accelerometer 50 is connected to a pitch erection control amplifier 52 which in turn provides a signal to the pitch precession torque motor 53 for erecting the rotor assembly 30 to maintain its spin axis 31 vertical. Similarly, roll accelerometer 51 is connected via a roll erection control amplifier 54 to a roll precession torque motor 55 for maintaining the spin axis 31 vertical.

An inner roll pickoff 60 is mounted to sense rotation of the inner gimbal 25 with respect to the pitch gimbal 20 and provides a signal accordingly via a roll followup servo amplifier 61 to a DC servo motor 62 which is mounted to rotate the outer roll gimbal 13 about the axis 14.

The spin axis 47 of the directional gyroscope 35 is maintained at right angles to its outer gimbal rotation axis 37 by means of a pickoff 62 which provides a signal to a levelling torque motor 63 for processing the directional gyro rotor assembly 46 in a conventional manner.

Pitch and roll attitude reference signals are provided by pitch and roll output resolvers 64 mounted on the outer roll gimbal 13 with respect to axes 23 and 14, respectively. An azimuthal reference signal is provided by an azimuth output resolver 66 mounted on the pitch gimbal 20 that is responsive to the movement of the azimuth gimbal 36 with respect to the azimuth axis 37.

In operation, during unaccelerated flight, the spin axis 31 of the vertical gyroscope 24 is maintained in a vertical position by the independent pitch and roll erection systems. Tilt about the pitch axis 23 is sensed by the pitch accelerometer 50 which provides a signal representative of the magnitude and sense of the tilt that is amplified in the pitch erection control amplifier 52 and applied to the pitch precession torque motor 53 thereby causing precession of the rotor assembly 30 in a direction to maintain the spin axis 31 vertical. In a similar manner, tilt about the roll axis 14 is sensed by the roll accelerometer 51 which provides a roll signal that is amplified in the amplifier 54 and applied to the roll precession torque motor 55 in a sense to maintain the spin axis 31 vertical. In a conventional manner, when the aircraft acceleration exceeds a predetermined value, the responsive annular pitch or roll accelerometer 50 or 51 provides a signal which is used to disable the respective erection amplifier for that axis to avoid erecting the vertical axis 31 to a false vertical. Normal erection procedure is again provided upon resumption of unaccelerated flight. Fast erection of the vertical gyroscope 24 may be provided during initialization of the platform 10 by increasing the voltages applied to the pitch and roll precession torque motors 53 and 55. Preferably, the pitch and roll accelerometers 50 and 51 are mounted on the stabilized pitch gimbal 20 in order to isolate their outputs from all pitch and roll attitudes of the aircraft 12.

One of the features of the present invention is that the directional gyroscope 35 is mounted on the stabilized pitch gimbal 20 of the vertical gyroscope 24. By maintaining the outer gimbal axis 37 in a vertical orientation, i.e., by pitch and roll stabilization, improved free gyroscope drift performance and elimination of directional gyroscope gimballing errors are achieved. The vertical gyroscope 24 preferably has an angular momentum that is substantially greater than that of the directional gyroscope 35, for example, in one suitable configuration, the vertical gyroscope has an angular momentum of $15 \times 10^6$ g.-cm.$^2$/sec. while the directional gyroscope has an angular momentum of $2.2 \times 10^6$ g.-cm.$^2$/sec. With the directional gyroscope 35 mounted on the pitch gimbal 20 of the vertical gyroscope 24, the former is brute force stabilized in pitch because of the high angular momentum of the vertical gyroscope 24 with respect to that of the directional gyroscope 35.

In certain prior art stable platforms, the directional gyroscope gimbal mass uncertainties are coupled to the roll and pitch axis of the vertical gyroscope thereby degrading drift performance in both axes. In the configuration of the present invention, the roll drift uncertainty is reduced through utilization of the very high angular momentum vertical gyroscope stabilizing the relatively low angular momentum directional gyroscope. Further, the present invention eliminates pitch drift uncertainty which is usually the most critical, by servo positioning the directional gyroscope 35 about the roll axis 14 by means of a single roll followup servo system comprising the pickoff 60, roll followup servo motor 61 and DC motor 62.

High performance vertical in formation is derived by utilizing a high angular momentum vertical gyroscope 24 mounted in a three gimbal structure. The three gimbals of the vertical gyroscope 24 are the outer roll gimbal 13, the pitch gimbal 20 and the inner gimbal 25. The outer or third gimbal 13 is a roll servoed gimbal using a direct drive DC servo motor 62 for the utmost in mechanical simplicity and reliability. Servo driving the outer roll gimbal 13 eliminates the need for the vertical gyroscope 24 to provide brute force stability in roll thereby providing better vertical gyroscope performance. In addition to stabilizing the directional gyroscope 35, the three gimbal vertical gyroscope portion of the platform 10 provides an all-attitude capability for both gyroscopes 24 and 35. The all-attitude capability is achieved by servo positioning the outer roll gimbal 13 to maintain the pitch axis 23 perpendicular to the vertical gyro spin axis 31 at all times. Contact with the inner gimbal stops (not shown) is avoided during extreme attitude maneuvers by providing an inner roll gimbal freedom of a sufficient amount such as ±25°. For example, when the platform 10 is flown through the 90° pitch position by a looping maneuver of the aircraft 12, the inner roll pickoff 60 provides a signal which is amplified in the amplifier 61 to drive the servo motor 62 in a direction to rotate the outer roll gimbal 13 through 180° to provide proper sensing of the heading and roll outputs. By thus stabilizing the directional gyroscope 35 in pitch and roll a heading or azimuthal output is provided which is free from the intercardinal gimbal errors of a conventional directional gyroscope.

The present invention may also be viewed from another aspect in which the vertical gyroscope 24 is considered a three gimbal design obtained by "turning" a conventional two gimbal vertical gyro 90° in azimuth and adding an outer or redundant servoed gimbal 13. The problems of mass shift normally associated with the pitch axis of a two gimbal vertical gyroscope manifest themselves as roll drift uncertainties in the three gimbal vertical configuration. As a result, the three gimbal gyroscopes has a significantly reduced susceptibility to lateral in-flight (turning) accelerations, but possesses a slightly higher sensitivity to fore-aft accelerations. However, a total overall performance advantage is obtained with the three gimbal gyroscope configuration.

The vertical gyroscope inner roll gimbal 25 serves as the gyro rotor housing and is stabilized about the inner roll axis 28 by the angular momentum of the gyroscope rotor 30. The pitch gimbal 20 in turn is stabilized by the gyroscope angular momentum about the pitch axis 23, and by the servo loop about the inner roll axis 28. Since the directional gyroscope 35 is located on the pitch gimbal 20, it is stabilized in the same manner; this prevents the gimbal mass uncertainty torques of the directional gyroscope 35 from affecting the vertical gyro drift rate about the pitch axis 23. An additional feature of this configuration is the elimination of the directional gyroscope slaving (precession) motor and consequently its reaction torque on the vertical gyroscope 24 in a manner to be more fully explained.

The ability to eliminate the requirement of a pitch servo system for pitch stabilization, such as shown in U.S. Pat. No. 3,266,325 entitled "Gyroscopic Apparatus" invented by M. A. Schaffer issued Aug. 16, 1966 and assigned to the assignee of the present invention, without introducing large drift errors is achieved through the use of a high angular momentum vertical gyroscope 24 to overcome unwanted, drift producing torques that result from the gimbal mass uncertainties. The momentum of 15 million dyne-centimeter seconds utilized in an embodiment of the present invention is approximately 2.5 times greater than that of conventional gyroscopes, yet the total inner gimbal assembly weight of 1.8 pounds is approximately the same. The figure of merit (H/W ratio) for the complete inner gimbal assembly is thus 2.5 times greater, and the resulting increase in "capacity" is available to overcome both directional and vertical gyroscope mass uncertainty torques within acceptable drift performance limits. In addition, the higher angular momentum provides increases resistance to gimbal friction torques (bearings, slip rings, etc).

The directional gyroscope 35 has 360° of freedom about its output azimuth axis 37 with the azimuth output signal being provided by the precession resolver 66. The pitch and roll outputs of the platform 10 are provided by pitch and roll output resolvers 64 and 65, respectively, thereby providing in conjunction with the resolver 62 attitude information with respect to the aircraft 12 about three mutually perpendicular reference axes.

Conventionally, precession of the directional gyroscope 35 in azimuth for purposes of slaving, earth rate correction and drift bias compensation is provided by means of a torquing device coupled to the directional gyroscope such as disclosed in said U.S. Pat. No. 3,266,325. However, during prior art type of slaving of the directional gyroscope 35, an undesirable reaction torque is applied to the vertical gyroscope 24 thereby degrading the output performance of the platform 10. In lieu thereof, the present configuration eliminates the torquing device with its additional weight and stringent performance requirements and instead provides the directional gyro precession compensation externally of the platform 10 by introducing compensating electronic signals in the external electronic system 70. This arrangement further improves the directional gyroscope drift performance by eliminating residual torquer uncertainties and reduces power consumption requirements within the platform 10.

The present invention therefore provides a relatively simple and reliable three axis gyroscopic stable platform having an all-attitude capability and high performance at an unusually reasonable cost.

While the invention has been described in its preferred embodiment, it is to be understood that the words which have been used are words of description rather than limitation and that any changes may be made without departing from the true scope and spirit of the invention in its broader aspects.

I claim:

1. A three axis gyroscopic stable reference apparatus for navigable craft comprising a first gimbal pivotally mounted on said craft for rotation about the roll axis of said craft, a second gimbal pivotally mounted on said first gimbal for rotation about the pitch axis of said craft, a vertical gyroscope in which said second gimbal forms the outer gimbal thereof and further having an inner gimbal pivotally mounted on said second gimbal for rotation about an inner roll axis, a directional gyroscope pivotally mounted on said second gimbal for providing an azimuthal reference, said vertical gyroscope having a normally vertical spin axis and a substantially greater angular momentum than said directional gyroscope for directly stabilizing said directional gyroscope, means including pitch and roll accelerometer means for providing signals representative of tilt in pitch and roll, respectively, to maintain said spin axis of said vertical gyroscope aligned with the gravity vertical, means including servo means responsive to said rotation of said inner gimbal about said inner roll axis for rotating said first gimbal to maintain said pitch axis perpendicular to said vertical gyroscope spin axis, and pickoff means coupled to said stable reference apparatus for providing attitude information with respect to said craft about three mutually perpendicular reference axes.

2. Apparatus of the character recited in claim 1 in which said pitch and roll accelerometer means are mounted on said second gimbal.

3. Apparatus of the character recited in claim 1 in which said directional gyroscope is mounted below said vertical gyroscope.

4. Apparatus of the character recited in claim 1 in which said means including servo means comprises a single roll followup servo loop.

5. A three axis gyroscopic stable reference apparatus for navigable craft comprising an outer roll gimbal pivotally mounted on said craft for rotation about the roll axis of said craft, a pitch gimbal pivotally mounted on said outer roll gimbal for rotation about the pitch axis of said craft, a vertical gyroscope in which said pitch gimbal forms the outer gimbal thereof and further having an inner gimbal pivotally mounted on said pitch gimbal for rotation about an inner roll axis, a directional gyroscope pivotally mounted on said second gimbal for providing an azimuthal reference, said vertical gyroscope having a normally vertical spin axis and a substantially greater angular momentum than said directional gyroscope for directly stabilizing said directional gyroscope, pitch and roll accelerometer means mounted on said pitch gimbal for providing signals representative of tilt in pitch and roll, respectively, pitch and roll erection control means responsive to said pitch and roll signals respectively for maintaining said vertical gyroscope spin axis aligned with the gravity vertical, means including roll followup servo means responsive to said rotation of said inner gimbal about said inner roll axis for rotating said outer roll gimbal to maintain said pitch axis perpendicular to said vertical gyroscope spin axis, and pickoff means coupled to said stable reference apparatus for providing attitude information with respect to said craft about three mutually perpendicular reference axes.

* * * * *